US008037105B2

(12) United States Patent
Kegel et al.

(10) Patent No.: US 8,037,105 B2
(45) Date of Patent: Oct. 11, 2011

(54) COMPUTER APPARATUS

(75) Inventors: Ian C Kegel, Woodbridge (GB); Jeremy M Thorne, Ipswich (GB); Martin Russ, Ipswich (GB); Timothy S Stevens, Woodbridge (GB); Jason Morphett, Halesworth (GB)

(73) Assignee: British Telecommunications public limited company, London (GB)

( * ) Notice: Subject to any disclaimer, the term of this patent is extended or adjusted under 35 U.S.C. 154(b) by 1078 days.

(21) Appl. No.: 10/593,585

(22) PCT Filed: Mar. 18, 2005

(86) PCT No.: PCT/GB2005/001051
§ 371 (c)(1),
(2), (4) Date: Sep. 21, 2006

(87) PCT Pub. No.: WO2005/093603
PCT Pub. Date: Oct. 6, 2005

(65) Prior Publication Data
US 2007/0214157 A1 Sep. 13, 2007

(30) Foreign Application Priority Data
Mar. 26, 2004 (GB) .................................. 0406860.7

(51) Int. Cl.
*G06F 17/30* (2006.01)
*G06F 7/00* (2006.01)
(52) U.S. Cl. ......... 707/803; 707/769; 707/796; 707/812
(58) Field of Classification Search ........................ None
See application file for complete search history.

(56) References Cited

U.S. PATENT DOCUMENTS 5,027,420 A 6/1991 Takebayashi et al.
5,267,351 A 11/1993 Reber et al.
5,305,389 A 4/1994 Palmer
(Continued)

FOREIGN PATENT DOCUMENTS
DE 10228597 A1 6/2003
(Continued)

OTHER PUBLICATIONS

International Search Report mailed Jul. 6, 2005 in International Application No. PCT/GB2005/001051.
(Continued)

*Primary Examiner* — Greta L Robinson
*Assistant Examiner* — James J Wilcox
(74) *Attorney, Agent, or Firm* — Nixon & Vanderhye P.C.

(57) ABSTRACT

A computer apparatus which uses a database (22) to offer persistent storage of metadata (36) describing the content of media files (32). Metadata is used to create a personalized media article (48) from those media files. That metadata also indicates relationships between those media files. In order to accelerate the creation of the personalized media article (48), media element metadata items are stored in a cache. The usefulness of this cache is improved further by reading related media elements data from retrieved metadata items (36), and then pre-fetching those items and placing them in the cache. Because the relatedness of the data items means that the related data item is more likely to be required in the near future, the caching method is more useful than known caching methods. Furthermore, the improved usefulness of the cache is achieved without placing constraints on where the data items are placed in the persistent storage.

9 Claims, 12 Drawing Sheets

U.S. PATENT DOCUMENTS

| | | | |
|---|---|---|---|
| 5,584,006 A | 12/1996 | Reber et al. | |
| 5,619,636 A | 4/1997 | Sweat et al. | |
| 5,708,767 A | 1/1998 | Yeo et al. | |
| 5,724,605 A | 3/1998 | Wissner | |
| 5,752,029 A | 5/1998 | Wissner | |
| 5,754,851 A | 5/1998 | Wissner | |
| 5,767,846 A | 6/1998 | Nakamura et al. | |
| 5,884,316 A * | 3/1999 | Bernstein et al. | 707/103 R |
| 5,896,506 A * | 4/1999 | Ali et al. | 709/213 |
| 6,016,380 A * | 1/2000 | Norton | 386/281 |
| 6,049,799 A * | 4/2000 | Mangat et al. | 707/10 |
| 6,058,102 A | 5/2000 | Drysdale et al. | |
| 6,085,020 A * | 7/2000 | Saito et al. | 386/327 |
| 6,185,538 B1 * | 2/2001 | Schulz | 704/278 |
| 6,204,840 B1 | 3/2001 | Petelycky et al. | |
| 6,311,194 B1 * | 10/2001 | Sheth et al. | 715/236 |
| 6,404,978 B1 * | 6/2002 | Abe | 386/281 |
| 6,560,236 B1 | 5/2003 | Varghese et al. | |
| 6,633,968 B2 * | 10/2003 | Zwiegincew et al. | 711/213 |
| 6,681,232 B1 | 1/2004 | Sistanizadeh et al. | |
| 6,701,316 B1 | 3/2004 | Li et al. | |
| 6,728,726 B1 * | 4/2004 | Bernstein et al. | 707/103 R |
| 6,771,881 B1 * | 8/2004 | Ketcham | 386/281 |
| 6,804,684 B2 * | 10/2004 | Stubler et al. | 1/1 |
| 2001/0009423 A1 | 7/2001 | Davis et al. | |
| 2002/0003506 A1 | 1/2002 | Freiberger et al. | |
| 2002/0010575 A1 * | 1/2002 | Haase et al. | 704/205 |
| 2002/0013943 A1 | 1/2002 | Haberman et al. | |
| 2002/0046208 A1 * | 4/2002 | Andersson et al. | 707/3 |
| 2002/0056095 A1 | 5/2002 | Uehara et al. | |
| 2002/0099737 A1 * | 7/2002 | Porter et al. | 707/513 |
| 2002/0122430 A1 | 9/2002 | Haberman et al. | |
| 2002/0186899 A1 | 12/2002 | Bohnenkamp | |
| 2003/0001846 A1 | 1/2003 | Davis et al. | |
| 2003/0045957 A1 | 3/2003 | Haberman et al. | |
| 2003/0142689 A1 | 7/2003 | Haberman et al. | |
| 2003/0149787 A1 | 8/2003 | Mangan | |
| 2004/0024550 A1 | 2/2004 | Doerken et al. | |
| 2004/0047289 A1 | 3/2004 | Azami | |
| 2004/0073690 A1 | 4/2004 | Hepworth | |
| 2004/0117257 A1 | 6/2004 | Haberman et al. | |
| 2004/0246376 A1 | 12/2004 | Sekiguchi et al. | |
| 2005/0120138 A1 | 6/2005 | Carmello et al. | |
| 2006/0206600 A1 | 9/2006 | Wong | |
| 2008/0019362 A1 | 1/2008 | Wainwright et al. | |
| 2008/0019382 A1 | 1/2008 | Wainwright et al. | |
| 2008/0019383 A1 | 1/2008 | Wainwright et al. | |
| 2008/0019384 A1 | 1/2008 | Wainwright et al. | |
| 2008/0112399 A1 | 5/2008 | Cohen et al. | |
| 2008/0186854 A1 | 8/2008 | Farrimond et al. | |
| 2008/188191 A1 | 8/2008 | Farrimond et al. | |

FOREIGN PATENT DOCUMENTS

| | | |
|---|---|---|
| EP | 0716525 A2 | 6/1996 |
| EP | 0948165 A1 | 10/1999 |
| EP | 1549005 A | 6/2005 |
| JP | 2001292173 | 10/2001 |
| JP | 2001-309269 | 11/2001 |
| JP | 2001-326922 | 11/2001 |
| JP | 2003-304473 | 10/2003 |
| WO | WO 93/21636 | 10/1993 |
| WO | WO 96/00946 | 1/1996 |
| WO | 97/45801 | 12/1997 |
| WO | WO 00/57276 | 9/2000 |
| WO | WO 01/77776 A2 | 10/2001 |
| WO | WO 02/28102 A1 | 4/2002 |
| WO | WO 02/32097 A | 4/2002 |
| WO | WO 02/057959 A2 | 7/2002 |
| WO | WO 02/071191 | 9/2002 |
| WO | WO 2004/025508 | 3/2004 |

OTHER PUBLICATIONS

Harder et al., "Datenbanksysteme. Konzepte und Techniken der Implementierung," 1999, pp. 121-122 and 151-152.

Mostefaoui et al., "Multimedia Prefetching Strategy for News-On-Demand Applications," Database and Expert Systems Applications, 1999, pp. 1-5.

Chidlovskii et al., "Semantic Cache Mechanism for Heterogeneous Web Querying," Computer Networks, vol. 31, No. 11-16, May 1999, pp. 1347-1360.

Xu et al., "Towards Semantics-Based Prefetching to Reduce Web Access Latency," Proceedings of the 2003 Symposium on Applications and the Internet (SAINT'03), Jan. 2003, 8 pages.

Bhattacharyya et al., "RFC 3569: An Overview of Source-Specific Multicast (SSM)", Internet Engineering Task Force, Jul. 2003, XP015009351.

European Search Report of Jan. 10, 2007.

European Search Report of Aug. 17, 2007.

Holbrook et al., "Using IGMPv3 and MLDv2 for Source-Specific Multicast (draft-holbrook-idmr-igmpv3-ssm-08.txt)", Internet Engineering Task Force, Oct. 1, 2004, XP015014473.

Lamb, et al., "The ObjectStore Database System", Communications of the ACM, 34(10):50-63, Oct. 1991.

McDysan, D., "QoS & Traffic Management in IP & ATM Networks", 2000, McGraw-Hill, US, XP002442599.

Park, K., et al., "On the Effectiveness of Route-Based Packet Filtering for Distributed DOS Attack Prevention in Power-Law Internets," Computer Communication Review, ACM, New York, NY, vol. 31, No. 4, Oct. 2001, pp. 15-26, XP001115743, ISSN: 0146-4833, p. 16, left-hand column, line 1-line 20.

Rosen Y. Rekhter Cisco Systems, et al., "BGP/MPLS VPNs" IETF Standard, Internet Engineering Task Force, IETF, CH Mar. 1999, XP015008330 ISSN: 0000-0003.

Singer, Beat, et al., "A Personal Assistant for Web Database Caching," in the proceedings of the Conference on Advanced Information Systems Engineering (2000).

European Search Report No. RS115250GB completed Jun. 7, 2007.

European Search Report No. RS115251GB completed Jun. 7, 2007.

Clark, M. et al., "Application-Level Measurements of Performance on the vBNS," Multimedia Computing and Systems, 1999, IEEE International Conference on Florence, Italy Jun. 7-11, 1999, Los Alamitos, CA, USA, IEEE Comput.Soc., U.S., vol. 2, Jun. 7, 1999, pp. 362-366, XP010519415.

Jiang, Y., et al., "Providing Quality of Service Monitoring: Challenges and Approaches," IEEE, Apr. 10, 2000, pp. 115-128, XP010376678.

International Search Report and the Written Opinion of the International Searching Authority mailed Feb. 26, 2008 in PCT/GB2007/003773.

Individual Submission Lennon/Schulzrinne Columbia University: "Transporting User Control Information in SIP Register Payloads; draft-lennon-sip-reg-payload-01.txt;" IETF Standard-Working-Draft, Internet Engineering Task Force, IETF, Ch, No. 1, Oct. 31, 2000, XP015031574, ISSN: 0000-0004.

U.S. Appl. No. 11/489,718, filed Jul. 20, 2006.

U.S. Appl. No. 11/489,719, filed Jul. 20, 2006.

U.S. Appl. No. 11/594,972, filed Nov. 9, 2006.

U.S. Appl. No. 11/594,973, filed Nov. 9, 2006.

U.S. Appl. No. 11/598,230, filed Nov. 13, 2006.

U.S. Appl. No. 11/702,665, filed Feb. 6, 2007.

U.S. Appl. No. 11/702,669, filed Feb. 6, 2007.

Translation of Office Action (6 pgs.) dated Aug. 17, 2010 issued in Japanese Application No. 2007-504460.

Office Action dated Sep. 21, 2007 issued in corresponding Chinese Application No. 03821664.7 with an at least partial English-language translation thereof.

Office Action dated Aug. 8, 2008 issued in corresponding Chinese Application No. 03821664.7 with an at least partial English-language translation thereof.

An at least partial English-language translation of an Office Action dated Apr. 17, 2009 issued in corresponding Japanese Application No. 2004-571920.

Office Action dated May 8, 2009 issued in corresponding Chinese Application No. 03821664.7 with an at least partial English-language translation thereof.

Office Action dated Nov. 20, 2009 issued in corresponding Chinese Application No. 03821664.7 with an at least partial English-language translation thereof.

An at least partial English-language translation of an Office Action dated Jan. 6, 2010 issued in corresponding Japanese Application No. 2004-571920.

An at least partial English-language translation of an Office Action dated Jan. 22, 2010 issued in corresponding Chinese Application No. 038216647.

Qiang Ma et al., "WebTelop: A dynamic integration and presentation system of web and broadcasting information", Information Processing Society Examination Report, Japan: Information Processing society of Japan, Jul. 17, 2002, vol. 2002, Nov. 67: pp. 169-176 with a partial English-language translation thereof.

Rehatschek, H. and Muller, H., "A Generic Annotation Model for Video Databases", Institute of Information Systems, Joanneum Research, Austria and Vrije Universiteit Amsterdam, 9 pages (undated).

Bateman et al., "InterMovie: A New Architecture for Interactive Media," Proceedings of the International Conference on Information Technology and Multimedia at UNITEN (ICIMm 2001), Aug. 15, 2001, 8 pages.

Inventors Listing of Prior Art, 1 page.

Mozart's Musikalisches Wuerfelspiel, A Musical Dice Game for Composing a Minuet, 1995, 3 pages.

Romance Writer, "Trouble Under the Stars," from Trivia Park, 2 pages.

StoryCraft 4.0, User Manual, 2001, pp. 1-21.

Martinez et al., "MPEG-7 The Generic Multimedia Content Description Standard, Part 1," IEEE Multimedia, Apr.-Jun. 2002, pp. 78-87.

Agamanolis, "Isis, Cabbage, and Viper: New Tools and Strategies for Designing Responsive Media," Jun. 2001, pp. 1-133.

Davis et al., "Media Streams: Video Annotation and Editing System," 2 pages.

Russ et al., "Smart Realisation: Delivering Content Smartly," Journal of the IBTE, vol. 2, Part 4, Oct.-Dec. 2001, pp. 12-17.

Gerdt et al., "StoryML: An XML Extension for Woven Stories," ITS 2002, LNCS 2363, 2002, pp. 893-902.

Gerdt et al., "Woven Stories as a Cognitive Tool," Cognitive Technology 2001, LNAI 2117, Springer-Verlag, 2001, pp. 233-247.

Gerdt et al., "Applying Computer Supported Collaborative Writing in Education," Paper Jul. 2001, 10 pages.

Rehatschek et al., "A Generic Annotation Model for Video Databases," Proceedings of Visual Information and Information Systems, Third International Conference, Visual 99, Jun. 2-4, 1999, pp. 383-391.

Davis, "Media Streams: An Iconic Visual Language for Video Annotation," Telektronikk 4.93, 1993, pp. 1-30.

Day et al., "A Multi-Level Abstraction and Modeling in Video Databases," Multimedia Systems Jul. 1999, pp. 409-423.

Ursula Wolz, Daniel Domen, Michael McAuliffe, "Multi-media integrated into CS 2: an interactive children's story as as unifying class project", ACM SIGCSE Bulletin, v.29 n. 3, p. 103-110, Sep. 1997.

Appeal Brief filed Dec. 20, 2010 in U.S. Appl. No. 10/525,381.

Examiner's Answer dated Feb. 16, 2011 issued in U.S. Appl. No. 10/525,381.

Reply Brief filed Apr. 18, 2011 in U.S. Appl. No. 10/525,381.

* cited by examiner

| Media Element ID | 0.53 | | |
|---|---|---|---|
| Media | URI | file://c:/media/AvB/0.53.avi | |
| | Format | windowsmedia | |
| | Position | In | 65:05 |
| | | Out | 65:35 |
| Structural | Description | Team B Goal 2 | |
| | Event | Nature | Goal |
| | | Performer | Paulo Di Canio |
| | | Recipient | Fabien Barthez |
| Domain Specific | Teams | Home Team | Team A |
| | | Away Team | Team B |
| | Performer Allegiance | Team A | |
| | Recipient Allegiance | Team B | |
| Conceptual | Interest Value | 0.7 | |
| | Rating | PG | |
| Relationship | Sequence ID | 1.4 | |
| | Sequence Location | 2 | |

Figure 3

| Title | Football Goal Highlights Template | |
|---|---|---|
| Section | Name | Intro |
| | Query | URI contains " Football Intro" |
| Section | Name | Main |
| | Query | Actor contains "Michael Owen" |
| | Constraint | Target Duration = 150s |
| Section | Name | Outro |
| | Query | URI contains "outro" |

Figure 6

| AvB Highlights | file://c:/media/intro.avi |
| --- | --- |
| | file://c:/media/AvB/010.avi |
| | file://c:/media/AvB/011.avi |
| | file://c:/media/AvB/012.avi |
| | file://c:/media/AvB/052.avi |
| | file://c:/media/AvB/053.avi |
| | file://c:/media/outro.avi |

Figure 12

COMPUTER APPARATUS

This application is the US national phase of international application PCT/GB2005/001051 filed 18 Mar. 2005 which designated the U.S. and claims benefit of GB 0406860.7, dated 26 Mar. 2004, the entire content of which is hereby incorporated by reference.

TECHNICAL FIELD

The present invention relates to computer apparatus. It has particular utility in relation to computer apparatus used in retrieving information from databases.

DESCRIPTION OF RELATED ART

A database is normally provided using a computer having a large amount of data items stored in persistent memory. The apparatus includes database management software which is executable to receive a query from an application program setting out criteria for the selection of data items from the database. Execution of the database management software will transfer the selected data to volatile memory on the computer running the application program.

Today, databases are often accessed via a communications network. For example, BT's directory enquiries database is available at http://www.bt.com/directory-enquiries.

The time taken to obtain a response to a query therefore depends on two factors—the time taken to identify those data items which satisfy the query, and the time taken to transfer data items to the volatile memory of the computer on which the relevant application program is running.

One way of reducing the time taken to obtain a response to a query is to cluster similar data items in a contiguous region of memory in the database, and then send the contents of that region of memory to a client computer in response to a query which selects a data item containing within that region. Any subsequent reference to a data item contained within the region can then be satisfied from the local memory. This is a feature of databases that operate on a so-called 'page-server' basis. An example of such a database is ObjectStore provided by Excelon Corporation (details of ObjectStore can be found in C. Lamb, G. Landis, J. Orestein, and D. Weinreb. The ObjectStore database system. Communications of the ACM, 34(10):50-63, October 1991 and International Patent Application WO 00/57276).

Another technique for reducing the average time taken to respond to a query is to store queries and their results in the local memory. It is found that users often repeat queries, and this enables a repeat query to be answered from local memory—thereby saving the time that would otherwise be spent in selected data items which meet the query and also the time spent in moving those data items to the local memory.

Yet another technique is to predict, on the basis of data about earlier queries, those queries that the user might be about to enter. This approach is seen, for example, in "A Personal Assistant for Web Database Caching" Beat Signer, Antonia Erni, Moira C. Norrie in the proceedings of the Conference on Advanced Information Systems Engineering (2000).

BRIEF DESCRIPTION OF PRESENT EXAMPLE EMBODIMENTS

According to a first aspect of the example embodiments of the present invention, there is provided computer apparatus having:

i) one or more data processors;
ii) persistent storage means connectable to said one or more data processors, said persistent storage means storing a plurality of data items, one or more of said data items containing reference(s) to one or more other data items whose content is semantically-related to said data items;
iii) volatile memory means, connectable to said one or more data processors, for storing one or more of said data items;
iv) database management system software executable by said one or more data processors to respond to a query by passing data items meeting one or more criteria specified in said query from said persistent storage means to said volatile memory means;
v) querying code executable by said one or more data processors to pass a query to said database management system software;
vi) pre-fetching code executable by said one or more data processors to:
a) analyse response data items provided in response to said query to find related data items semantically-related to said response data items; and
b) automatically generate another query for said semantically-related data items.

By selecting data items in response to a request for transfer from a persistent memory to a cache memory and then selecting further data items according to relationship data which forms part of the earlier selected data items, and moving the further data items to the cache memory as well, the response time to subsequent related requests is reduced.

According to a second aspect of example embodiments of the present invention, there is provided a method of operating computer apparatus comprising a processor and first and second data stores accessible to said processor, access by said processor to data held in said first store being quicker than access to said second store, said method comprising the steps of:

storing a plurality of data items in said second data store, together with relationship data indicating relationships between said data items; and
executing a process on said processor to:
i) fetch one or more data items from said second store together with relationship data indicating one or more related data items semantically related to said fetched data item;
ii) responsive to receipt of said relationship data, fetch one or more of said semantically related data items from said second memory to said first memory; and
iii) check, on subsequent requests for a data item, whether said requested data item is present in said first store and read said data item from said first store if found.

A given data item often represents, or represents characteristics of, a real or imagined entity. A further data item semantically related to that given data item represents, or represents characteristics of, a real or imagined entity which is related to the real or imagined entity represented by that given data item.

BRIEF DESCRIPTION OF THE DRAWINGS

By way of example only, specific embodiments of the present invention will now be described with reference to the accompanying Figures in which:

FIG. 3 shows metadata associated with a file;

FIG. 6 shows template data generated using a template creation tool;

FIG. 12 shows an edit decision list as might be produced by the template populator module.

DETAILED DESCRIPTION OF NON-LIMITING EXAMPLE EMBODIMENTS

Figure 1:
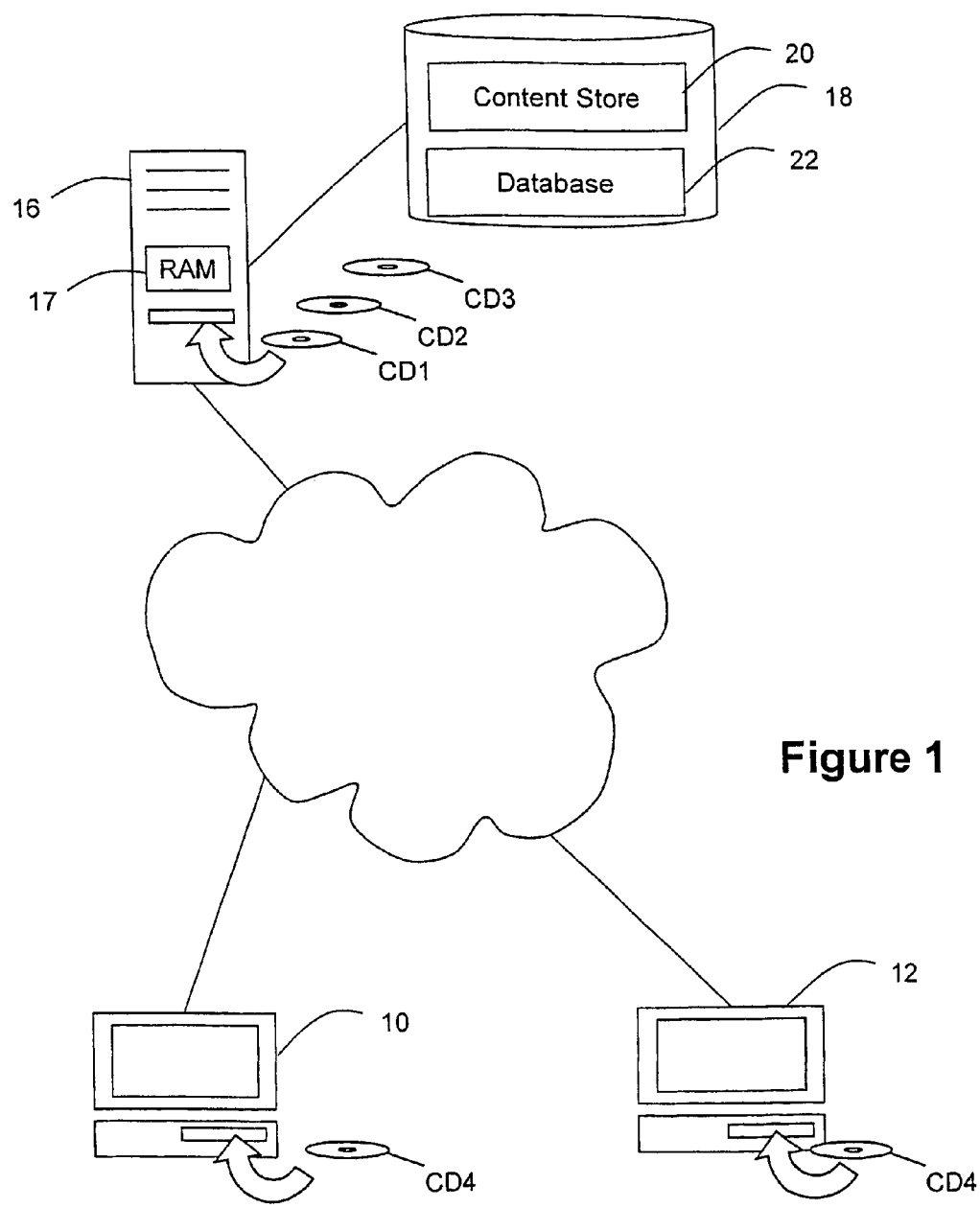
FIG. 1 is a schematic illustration of a media content distribution system according to a first embodiment of the present invention.

FIG. 1 shows two personal computers 10, 12 each of which comprises well-known hardware components connected together in a conventional manner. The well-known hardware components comprise a central processing unit, volatile memory—in this case, random access memory—read-only memory, a hard disk and input/output devices. The hardware components are interconnected via one or more data and address buses. The input/output devices comprise a monitor, a keyboard, a mouse, a CD ROM drive and a network card. The network card is connected to a server computer 16 by the public Internet 14.

The server computer 16 has a similar architecture to the personal computers 10, 12, but is provided with a faster processor and a much greater amount of persistent storage. This storage takes the form of a Redundant Array of Inexpensive Disks (RAID) 18. The RAID stores a collection of media files 20.

The server computer 16 has ObjectStore database server and ObjectStore Application Programmer Interface (API) software from CD1 installed upon it. Such software is available from Excelon Corporation of 25 Mall Road, Burlington, Mass., U.S.A. In addition, an ObjectStore client program which makes use of the API software, and which includes a template populator module, and an Remote Procedure Call (RPC) server module is installed from CD2 onto server computer 16. Included with the ObjectStore client program is code supplied by Excelon corporation which carries out much of the processing required in handling a query, the server program merely providing pages (4K blocks of memory) when requested to do so by the ObjectStore client program. A third compact disc CD3 provides a media mark-up tool program which is also installed on the server computer 16. The media mark-up tool program and the template populator program are described in the applicant's earlier International Patent application GB2003/003976, which is hereby incorporated herein by reference.

Figure 2:
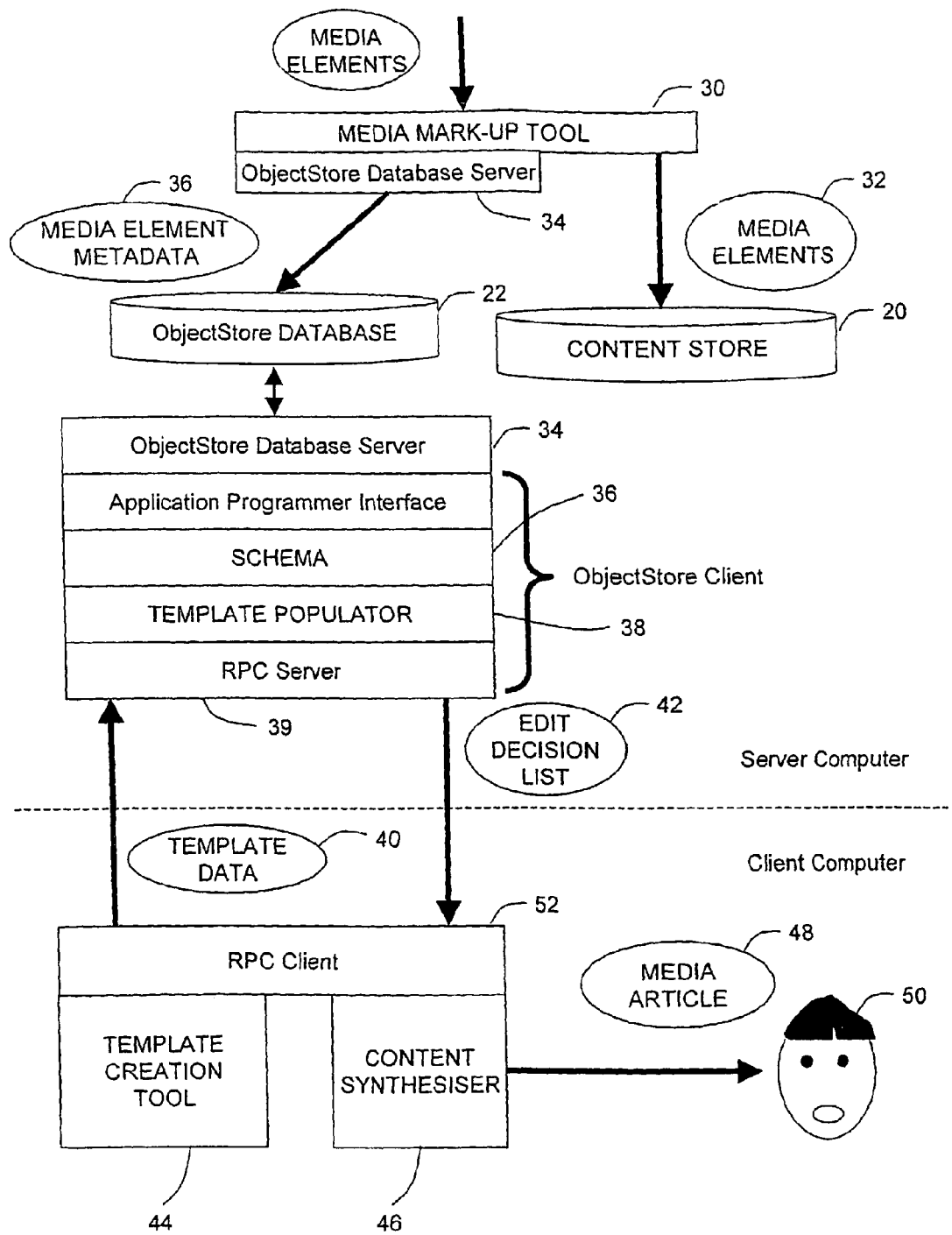
FIG. 2 shows the architecture of the software run on the computers shown in FIG. 1.

Each of the personal computers has a template creation tool program, content synthesiser, and RPC client program from CD4 installed upon it. The template creation program and the content synthesiser are described in the applicant's co-pending International Patent application GB2003/003976. An RPC client program can easily be provided by a person skilled in the art. The structure and operation and interoperations of these programs will now be described with reference to FIG. 2.

The media mark-up tool 30 provides an interface for an editor to update the content store 20 and the database 22. In practice it is envisaged that an editor using the present embodiment will have access to media elements 32 generated by other editors, rushes from various sources, sections of prepared programmes, still photographs and various other pieces of media (all represented in electronic form) at his disposal. These media elements are stored in an appropriate directory structure in the content store 20. Each directory is known as a 'bin' in the art—a reference to the labelled bins in which rolls of film relating to a particular project are stored.

However, for the purposes of the present description, it is assumed that the editor begins only with a file that includes an electronic representation of unedited film recorded at a football match and introduction sequences for a football programme etc. An unedited piece of film is known as a 'rush' in the art.

Using the media mark-up tool 30, the editor might select various sections of the rush and store each as a media element in a shorter file in a directory in the content store 20.

The media mark-up tool 30 also provides a tool enabling the editor to generate or edit metadata 36 for media elements stored in the content store 20. The mark-up tool program 30 uses the ObjectStore server database software 34 to store a metadata item 36 for each media file 32 as part of the ObjectStore database 22 held in the RAID 18.

The media mark-up tool 30 has been described here in order to put the present embodiment in the context of a larger media article creation and delivery system. It is to be understood however, that alternative embodiments of the present invention could be provided in which an existing media article metadata database and content store is used, without providing an editor with a capability to add to the database—i.e without requiring the provision of CD3 in the present example.

Figure 4:
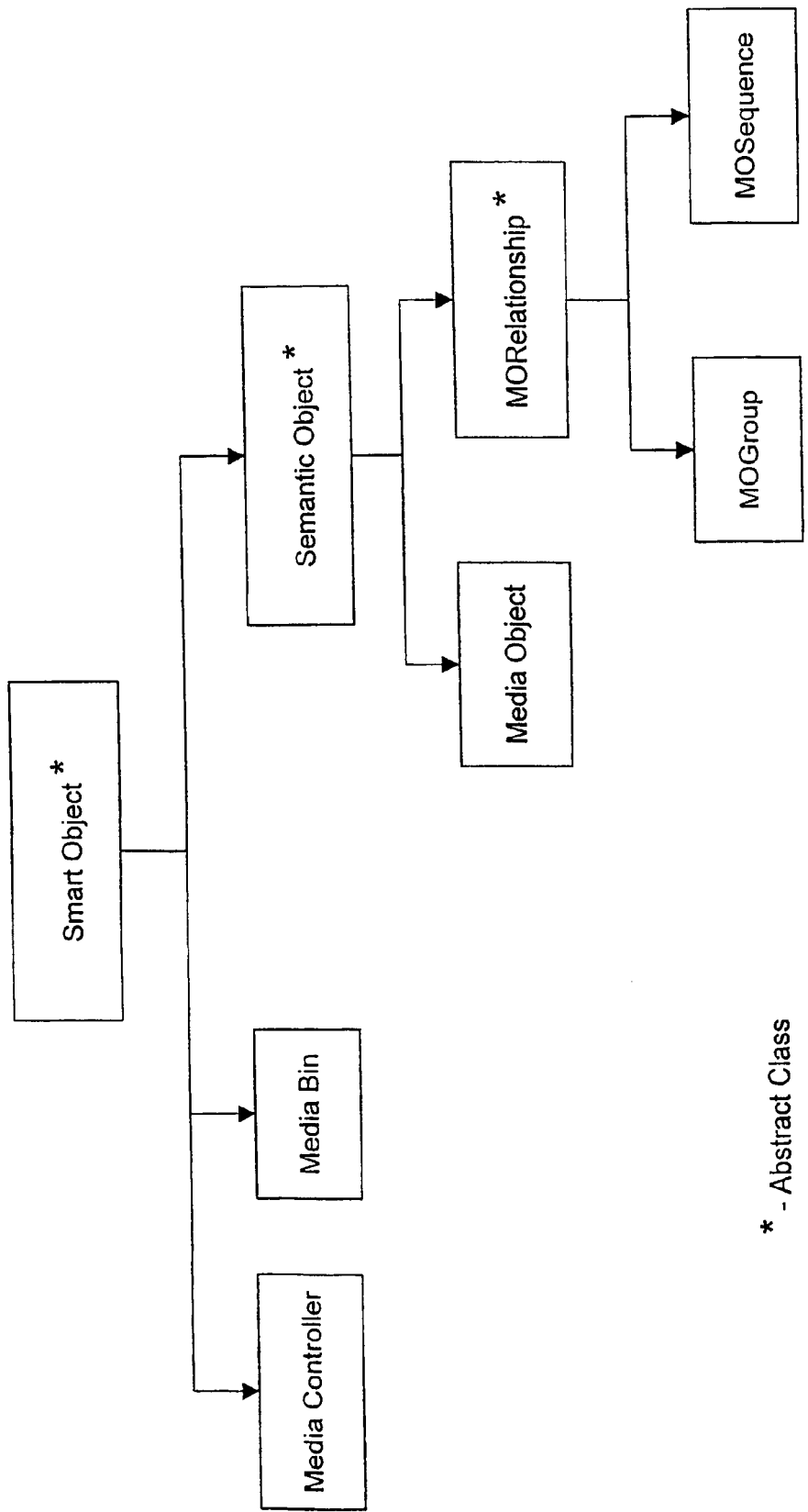
FIG. 4 shows an object-oriented database schema used in the first embodiment.

The ObjectStore Client program on CD2 includes a definition of a database schema 36 which will be described in more detail below with reference to FIG. 4. It also includes a template populator program 38 which receives template data 40 from a client computer 10,12 and processes it to generate an Edit Decision List 42 for return to the client computer 10,12. The operation of the template populator program 38 will be discussed in more detail below with reference to FIGS. 7 and 8. Also included in the ObjectStore client program is an RPC Server 39 which enables communication of the template data 40 and the Edit Decision List 42 between the server computer 16 and a client computer (10,12 for example).

The template creation tool 44, installed on the client computer 10,12 from CD4, is used to create the template data 44. The content synthesiser tool 46 installed from the same CD4 is used to fetch the media elements 32 listed in the Edit Decision List 42 from the content store 20 and to combine them in order to generate a media article 48, based on the template data 40 to a user 50. Communication between the server computer 16 and the client computers 10,12 takes place using the RPC Client 52.

The information included in a Media Object (a software object forming a component of the database 22) is shown in FIG. 3.

To enter this information, having selected one of the media elements, the editor enters metadata to be associated with that media element in two stages. In a first stage, the editor can double-click on one of the pictures to bring up a form onto which the values of the parameters included within the schema can be entered.

An example of the metadata generated in the first stage is shown in the second to twelfth row of FIG. 3 (the information in the first row having been generated when the editor gave a media element identifier to the file).

It will be realised that the metadata is arranged in accordance with a structured data model. In each row, the entry at the rightmost column represents the value of a property which is input by the user. The structured data model may provide that a plurality of properties should be labelled as members of a unit at a first level of aggregation—here referred to as a set of properties (column second from the left in those rows which have four columns). The structured data model may also provide that a plurality of sets should be labelled as members of a unit at a second level of aggregation—here referred to as a superset of properties (leftmost column in those rows which have three or four columns). Those skilled in the art will realise that further levels of aggregation might be provided.

The hierarchical arrangement is influenced by the Multimedia Content Description Interface mentioned above. The intention is not to enforce usage of a complete data model across all possible applications, but to enable re-use of content within the subject domain of a production company or a specific set of projects (eg. wildlife documentaries). The data model provided is intended to provide a maximal set of elements and an interface which assists their use and the vocabularies which can be applied to them.

The metadata includes a variable number of parameters (but must nevertheless conform with the predetermined structured data model). In the example, shown in FIG. 3, the editor has entered values for 18 properties. These include:
i) Media Element ID—this identifies the media element—in the present example, the editor has given it a numerical value of 0.xx, where xx reflects the position of the media element within the original rush;

This is followed by a 'Media' superset which comprises two properties and a 'Position' set of properties. The two properties are:
ii) URI—the Universal Resource Identifier of the file which contains the media element;
iii) Format—this gives an indication of the format of the data making up the file;

The 'Position' set contains two properties as follows:
iv) In—an indication of the time elapsed since the start of the rush at the start of the media element;
v) Out—an indication of the time elapsed since the start of the rush at the start of the media element;

The 'Media' superset is followed by a superset of four 'structural' properties. That superset begins with
vi) Description—a description of the content of the file;
which are followed by another set (called 'Event') which contains three properties:
vii) Nature—the type of event that is seen in the video sequence recorded in this file;
viii) Performer—the person performing the principal action of the event;
ix) Recipient—the person subject to the principal action of the event;

These properties are followed by a domain-specific superset of properties which, in this example, are only sensibly applied to media elements which relate to material obtained from two-sided sporting events;

The first two properties belong to a set (called 'Teams') of two properties:
x) Home Team—the name of the team playing on their home ground during the football match featured in the original rush;
xi) Away Team—the name of the other football team in the football match featured in the original rush;

This set is followed by the two properties:
xii) Performer Allegiance—the side (if any) to which the performer owes allegiance;
xiii) Recipient Allegiance—the side (if any) to which the recipient owes allegiance;

These two properties are followed by a set (named 'conceptual') containing two properties:
xiv) Interest Value—this value, between 0 and 1 indicates how significant the editor considers this media element to be; and
xv) Rating—this value indicates the suitability of the media element for showing to people based on an age criterion—in a similar way to the classification given to films.

The second stage of the metadata creation which generates one or more 'Relationship' properties is described in detail in the applicant's earlier international patent application GB2003/003976. The user is provided with a graphical user interface, allowing him to indicate relationship properties between media elements by moving and clicking on icons representing those media elements on the screen 18 of the PC (FIG. 1).

One type of relationship that the editor may indicate is that of sequence. An editor might wish to indicate a sequential relationship of this nature where he feels that the media elements should be shown in the indicated order (if more than one of the media elements are selected in response to a query made to the ObjectStore database management system). Media elements showing gardening at different times of year, for example, might be arranged into a sequence so that an element representing the garden in spring precedes an element representing the garden in summer and so on.

On creation of a sequence in this way, a sequence object is created in the object-oriented database as a container object containing pointers to the media objects associated with the media elements included within the sequence. As will be seen below, it is possible to generate a sequence which itself includes sequences. This hierarchical property is reflected in the first number in the identifier attributed to the sequence. Where the sequence includes only individual media elements, then the sequence identifier is of the form 1.x where x is simply incremented at each time a new sequence or group (explained below) at the first level of the hierarchy is formed.

The media object (i.e. metadata) associated with each media element in the sequence has the position of the media element within that sequence added to it. An example of the sequence position metadata can be seen in the penultimate row of FIG. 3.

Another type of relationship an editor may wish to indicate between media elements is that of membership of a group. An editor might do this where he wishes to indicate that if a plurality of the media elements in the group are selected, then they should be shown together. This action creates a group object, a container object which contains pointers to the media objects associated with the media elements within the group. Group objects are also stored within the object-oriented database 22.

Object-oriented programming involves the writing of classes (user-defined data types which have methods as well as data members within them). Programs then create and manipulate instances of those classes in order to do their work when executed on a computer.

Similarly, object-oriented databases hold instances of object classes which have both data members (such as the metadata seen in FIG. 3) and methods allowing queries to be made on those data members.

In object-oriented programming, a programmer can build hierarchy of object classes. In such a hierarchy an object class inherits the data members and methods of the parent object class. In writing new classes, it is possible to change the implementation of the methods (this is known as overriding the parent object method), or to add to the inherited data members or methods of the parent object class. This is one way in which object-oriented programming promotes code re-use.

Aside from inheritance, another way in which object-oriented programming promotes code re-use is known as composition. In this case, an object class can be written to include objects of another type as data members.

It is possible for a programmer to define an abstract class. If a class is declared to be abstract by the programmer, then it is not possible to create instances of objects of that class. It is only used as a way of ensuring that any sub-classes written by a programmer do have all the data members and methods of the abstract parent class.

Similar concepts are used in object-oriented databases such as ObjectStore. FIG. 4 shows an object hierarchy used in a first embodiment of the present invention.

All objects in the database inherit data members and methods from the base class SmartObject. This ensures that all objects to be stored in the database have certain attributes which enable them to be persistent (i.e. stored in the ObjectStore database). Additionally, the inheritance from SmartObject ensures that other Methods (such as the ability to interrogate an object to find its type, or to ask it to render itself in eXtensible Markup Language (XML)), which are useful throughout the database are present in all objects stored within the database.

MediaController is the 'root' object in the database (modelled as a singleton pattern—i.e. there is only ever one instance of an object of this class). It has a collection of MediaBin objects within its data members (an example of composition).

The MediaController collection class (a C++ template) has functions that enable queries in the form of expressions to be made on it. For example, an instance of a MediaController object (that instance being called binList in this example) can be queried like:
MediaController::binList->query("MediaObject*", "m_objId%2==0").

This query results in a call to a query method forming a part of all MediaController objects (including binList) which returns the result of the query. In the above example a collection of MediaObject pointers with even object ID's would be returned.

MediaBin objects can hold other MediaBin objects within them in a directory-like hierarchical structure. So for example, a 'WorldCup' MediaBin may hold a MediaBin within it called 'EnglandSweden'. Equally, the 'EnglandSweden' MediaBin will hold clustered MediaObjects from the England Sweden World Cup game.

The MediaBin object class also has a collection of SemanticObjects. SemanticObject is an abstract class. The MediaObject, MORelationship, MOGroup and MOSequence classes are all sub-classes of the abstract SemanticObject class (an example of inheritance). MediaObject is the object which contains the metadata like that seen in FIG. 2.

MORelationship is an intermediate abstract class with MOGroup and MOSequence inheriting from it.

SemanticObjects (and, by inheritance, MediaObjects) have a data member (called parentRelationship) which is a pointer to an MORelationship object. MediaObjects with no parent relationship (called 'root objects') have this Member set to NULL.

MORelationship objects have some public abstract methods which are overloaded in the two MORelationship sub-classes, MOGroup and MOSequence, these are:
public
    virtual BOOL insertObject(SmartObject*_data)=0;
    virtual BOOL removeObject(SmartObject*_ptr)=0;
    virtual BOOL contains(SmartObject*_ptr)=0;
protected
    virtual BOOL insertObject(SmartObject*_data, Coll<SmartObject*>*_col);
    virtual BOOL removeObject(SmartObject*_ptr, Coll<SmartObject*>*_col);
    virtual BOOL contains(SmartObject*ptr, Coll<SmartObject*>*_col);

MOGroup overloads these public methods and calls the MORelationship protected methods passing in a Coll object (an unordered collection). MOSequence overloads the same methods and calls the protected methods with a List object (as an ordered collection, inherited from Coll).

Furthermore, MOSequence also provides additional public methods in the form of insertFirst, insertLast, insertObjectBefore and insertObjectAfter to insert objects at predefined points in a sequence of semantically related objects.

As mentioned, MORelationship objects can hold collections of SmartObjects. However, the TYPE's of SmartObject held by MORelationship objects are restricted (e.g. MediaBins are not held by MORelationship objects). The SmartObject types held are restricted to the children of SemanticObject: (i) MOGroup; (ii) MOSequence and (iii) MediaObject.

Upon insertion into an MORelationship object, a check is made by calling getType (inherited and overloaded from SmartObject by each derived class) on the incoming object to validate its TYPE. Assuming it is valid, the object is added to the collection (or list) and its parentRelationship attribute set to be the MORelationship to which it has just been added.

The Boolean value returned by the insertion and removal objects indicates whether the insertion or removal was successfully carried out.

Figure 5:
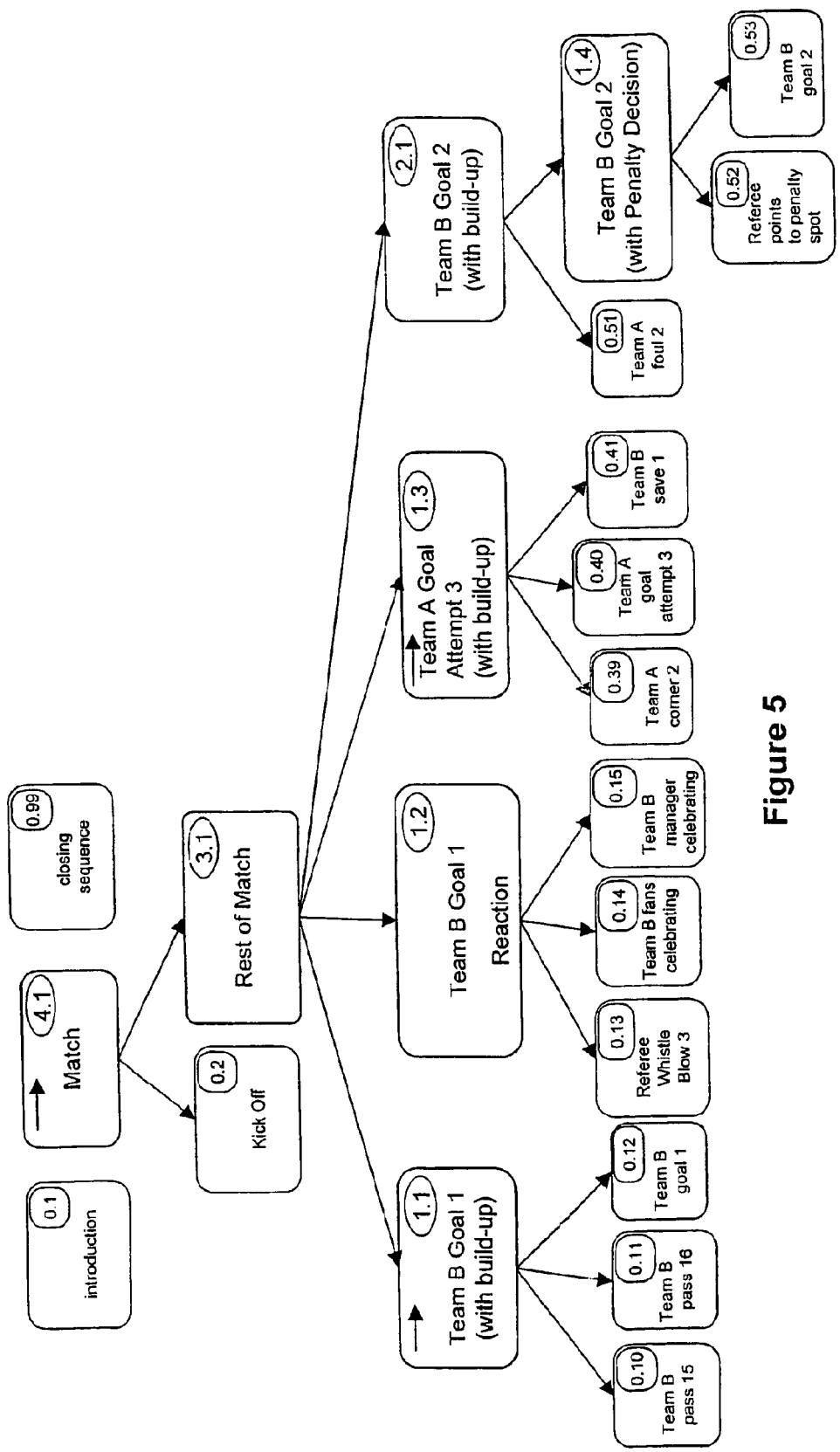
FIG. 5 is a hierarchical representation of the relationship data entered by the editor.

With the above methods, an editor is able to generate MOGroup and MOSequence objects which contain lists of pointers to MediaObjects. FIG. 5 shows the relationships entered by the editor in hierarchical form. Note that the editor-generated hierarchy shown in FIG. 5 is unrelated to the database schema hierarchy seen in FIG. 4. It would not be practicable to change the database schema every time an editor changed his or her arrangement of a number of media elements. Instead the linkages seen in FIG. 4 are stored in as data members of MOGroup and MOSequence objects.

In the editor-generated hierarchy, MediaObjects are seen at the 'leaves' of the tree structure. Many of the MediaObjects (e.g. 0.13, 0.14, 0.15) are arranged into groups (e.g. 1.2)—shown as rectangles having arrows beneath them pointing to the MediaObjects which belong to them. Sequences are portrayed similarly, save for having an arrow in the top left-hand corner of the rectangle. Groups and Sequences can themselves be members of higher-level Groups and Sequences.

The template creation tool code which is installed from CD4 onto the client computers 10,12 executes to provide an interface for a user to specify the desired characteristics of a media article—thus creating template data 40.

Like a media object, a template object for use in the present embodiment conforms to a comprehensive predefined data model. As can be seen from FIG. 6, this predefined data model includes a title field, and a plurality of sections. Each section is a set comprising a name field, a query field, and, optionally, a constraint field. When run, the template creation program controls the client computer 10,12 to prompt the user to enter a name for the template and to indicate the section structure (top-level sections may themselves contain sections). The user indicates the section structure using a graphical user interface component similar to the Folder List provided in Microsoft Windows Explorer for example. In the example given in FIG. 6, the template has a flat structure of three sections.

The user uses this graphical user interface to enter query strings for each of the sections. The query string for the middle section in FIG. 6 indicates that candidate media objects to fill this slot in the template must have Michael Owen as a named actor.

The user may also enter one or more constraints for those sections where he wishes to place some constraint on the media elements represented by the media objects retrieved from the database in response to the query. Constraints are intended to restrict the way in which media objects are assembled by the template populator. Possible examples of constraints include time (e.g. this section must be 5 minutes long), space (e.g. this presentation must be viewed on a 640*480 pixel display), or number (there must be five news items in the 'headlines' section of a news programme).

Once the user indicates that the template is complete, the client computer 10,12 sends the template data 40 (using the RPC client and server 39,52) to the server computer 16.

Figure 7:
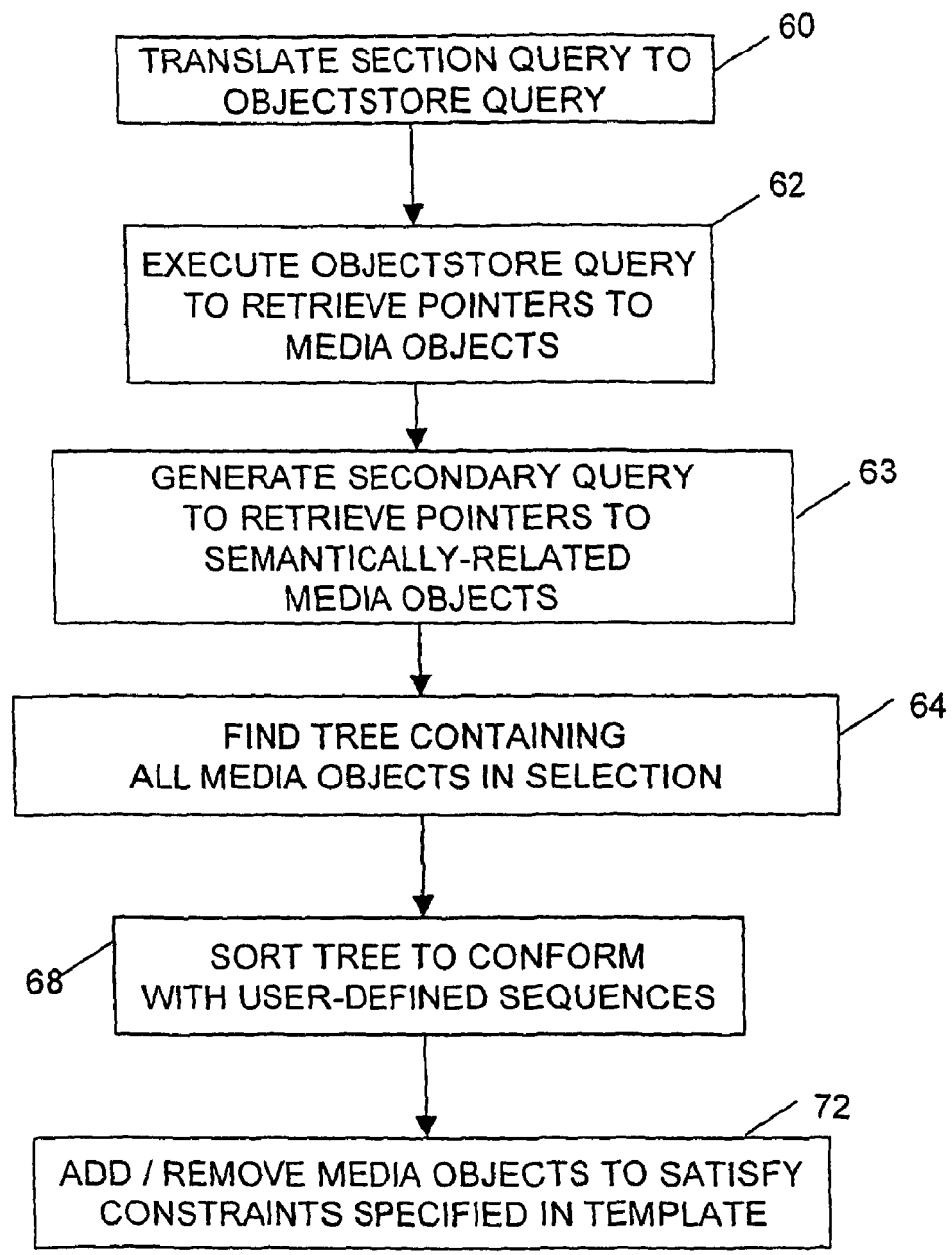
FIG. 7 is a flow chart showing the operation of the template populator component of the first embodiment of the present invention

The template data 40 is then passed to the template populator program 38 which operates as indicated in FIG. 7.

As explained above the template populator module 38 provides a process for automatically assembling an edit decision list 42 in preparation for the synthesis of a set of media objects into a personalised media article 48 for a consumer 50. On starting, the template populator 38 takes as its inputs a specific template (e.g. FIG. 6) and an indicator of a store of media objects (in the present case, an indication of the location of the object-oriented database 22).

The template populator then identifies the first section of the template (FIG. 6) and iterates through the template's hierarchical structure.

Each iteration (FIG. 7) involves the next section in the template being found, any query in that section being translated to an ObjectStore query (step 60), executed by the ObjectStore server and client programs (step 62) to return a set of pointers (references) to relevant media objects. The returned references are then used to issue a further ObjectStore query for media objects which are semantically-related to the media objects pointed to by the received references (step 63). Thereafter, various steps (64, 68, 72) are carried out to produce the part of the Edit Decision List 42 corresponding to the section of the template being worked on in the current iteration of the template populator program.

The second iteration which relates to the section named 'Main' in FIG. 6 will now be described. The iteration begins (step 62) with the carrying out of the query contained with the section. The query within the second section requests all MediaObjects mentioning Michael Owen as a named actor discussed above.

Figure 8:
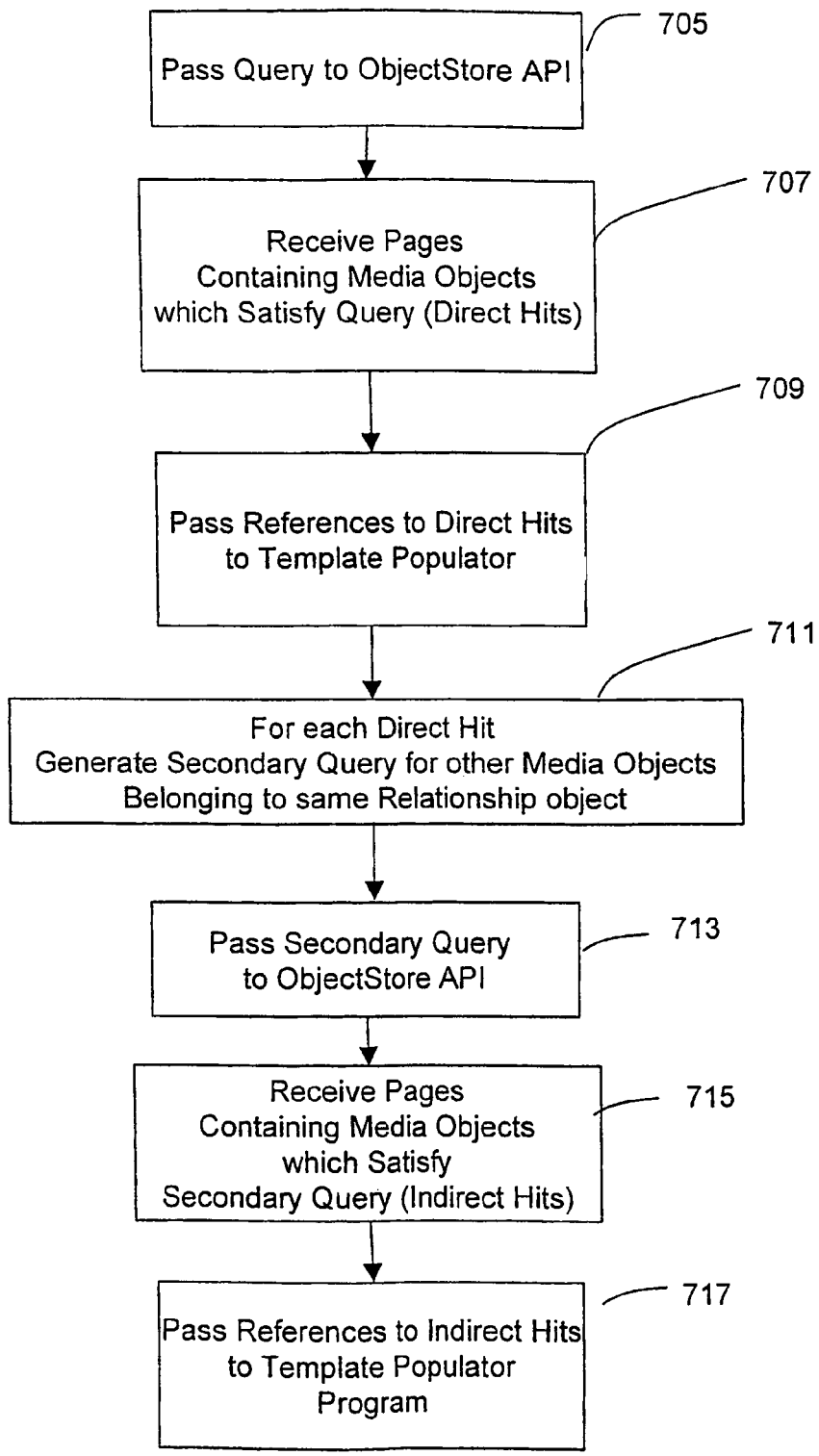
FIG. 8 shows some of the steps of FIG. 7 in more detail.

FIG. 8 shows the processing involved in the steps (FIG. 7: 62,63) of issuing and answering the primary and secondary query in more detail. In step 705, an ObjectStore query—in this example similar to the one below—would be carried out over a MediaBin called binList:

binList->query("MediaObject*",
  "m_mediaObjects[:
    m_actorList[:strcmp(data,"Michael Owen")==0:]:]").

This returns, to the template populator program 38 a collection of references to MediaObjects in which "Michael Owen" is a named actor.

Step 707 indicates that ObjectStore database server 34 and ObjectStore client program (36, 38, 39) interoperate in such a way as to bring pages (4K units of memory) accessed as the ObjectStore database server answers the query, from the RAID 18 to the volatile memory (RAM) 17 of the server computer. Even when any index present in the database is used in answering the query, this will result in the pages which contain the Media Objects which satisfy the query being brought into the volatile memory 17.

In more detail, the ObjectStore client program uses the virtual memory (page-swapping) code provided by modern operating systems (in the present example, it is assumed that the server computer 16 is running a suitable operating system program such as Windows NT), in order to handle references which point to objects on pages which have not yet been transferred to the volatile memory 17 of the server computer 16 from the RAID 18. Those skilled in the art will realise that this situation is similar to that used in page-swapping systems where pages of memory are transferred between the hard disk of a PC and the volatile memory of that PC. Virtual memory is used where the combined size of a program, data and stack is greater than the available physical memory. Where the pages on which referenced objects reside are already in the volatile memory 17 of the server computer 16, following the pointers is straightforward matter for the ObjectStore client program, however where the relevant page has not yet been transferred to the volatile memory 17 of the server computer, the virtual memory code issues a memory fault. The ObjectStore client code responds to the memory fault by requesting the relevant page from the ObjectStore database server 34.

Thus, the above-mentioned article about ObjectStore states: "ObjectStore maintains a client cache, a pool of database pages that have recently been used, in the virtual memory of the client host. When the application signals a memory fault, ObjectStore determines whether the page being accessed is in the client cache. If not, it asks the ObjectStore server to transmit the page to the client, and puts the page into the client cache. Then, the page of the client cache is mapped into virtual address space [of the client host], so that the application can access it. Finally, the faulting instruction is restarted, and the application continues."

Although the above paragraph refers to a situation where the ObjectStore client program is running on a client computer different from the server computer where the database is stored, the same advantage is seen in a situation where the ObjectStore database server and ObjectStore client program are running on the same computer (as is the case in the present embodiment)—the client program (36,38,39) will resolve a query more quickly if one or more of the Media Objects it must access in order to answer the query are within pages held in a cache within that part of the memory 17 allotted to the client program. The default size of the cache is 8 MB—however this may be altered by the administrator of the server computer 17.

Figure 9:
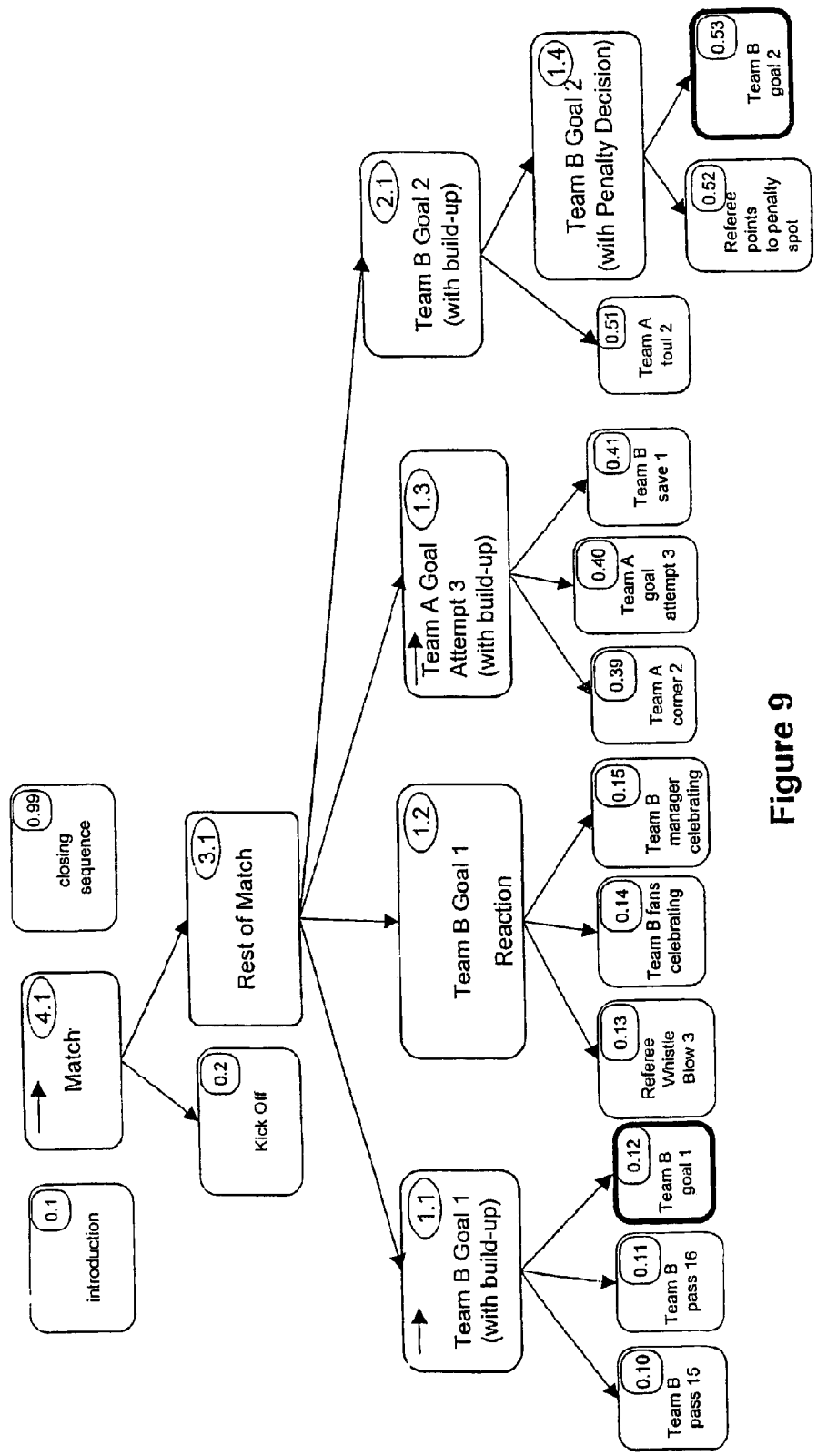
FIG. 9 shows media objects selected in response to a primary query.

The answering of the query issued in step 705 might result in the selection of the MediaObjects outlined in bold in FIG. 9, for example. Each of those media objects will be held in the cache—i.e. in the volatile memory 17 of the server computer 16. References to those objects are passed to the template populator program 38.

In step 711, a further query is made for MediaObjects which have the same parent as each of the MediaObjects returned in response to the first query, (through the parentRelationship and MORelationship data members of each of the selected MediaObjects). The effect of constructing this second (and any subsequent) set of semantic queries is to transfer 'related' objects from the RAID 18 into the volatile memory 17 of the server computer 16.

Figure 10:
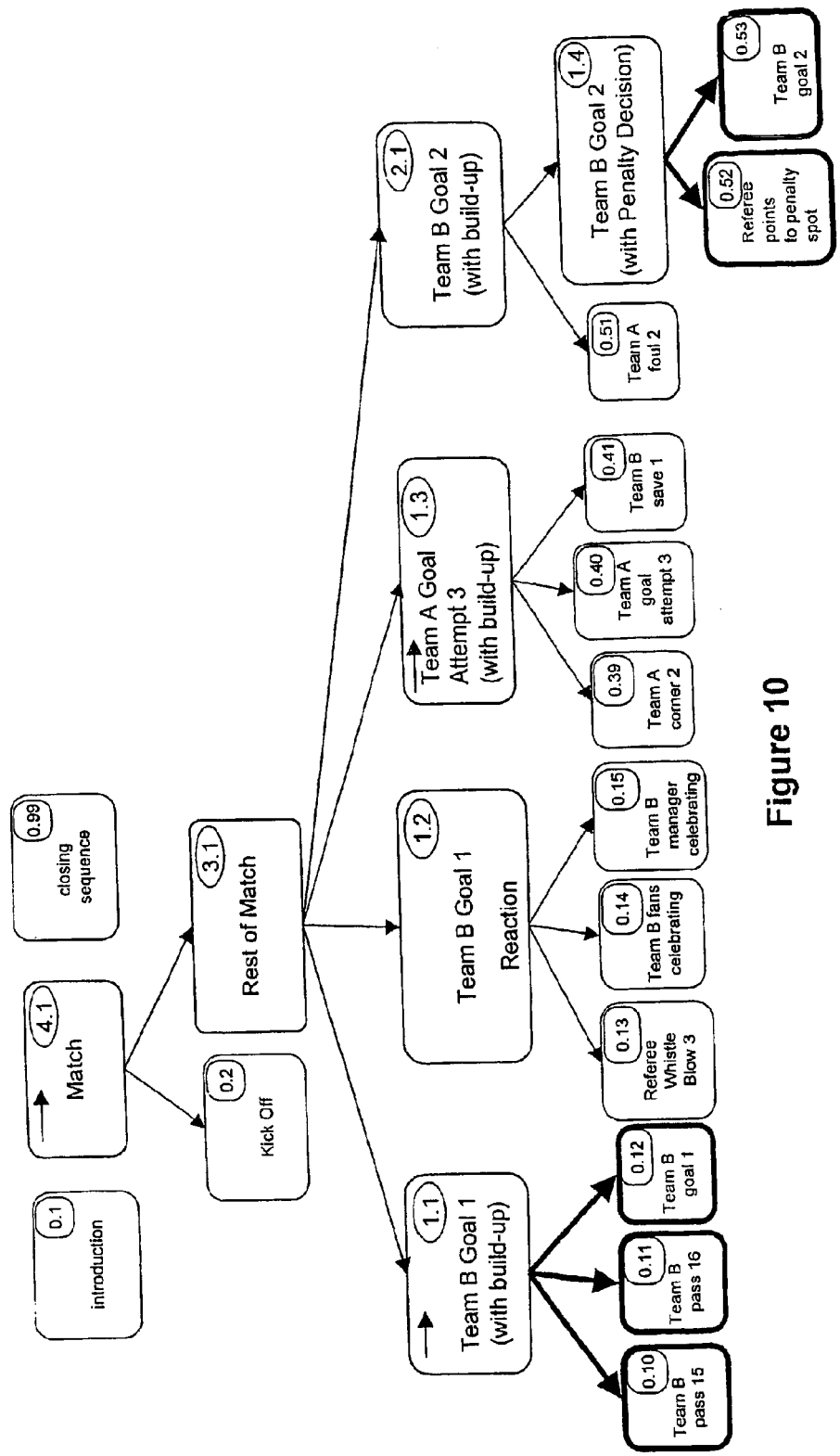
FIG. 10 shows media objects selected in response to a secondary query.

This secondary query might result in the selection of the MediaObjects outlined in bold in FIG. 10, for example. Again, the pages containing those media objects are transferred from the RAID 18 to the volatile memory 17 (step 715) and references to those media objects are provided to the template populator code (step 717).

Returning to FIG. 7, in step 64, a tree is constructed which includes the media objects selected in response to the first query as its 'leaves'. This construction takes place as follows: The parent object of the first selected media object is retrieved followed by its parent object and so forth until an object is reached which has no parent object associated with it. At this point, a single linked list from the leaf object to the top-level container has been reconstructed. Another selected leaf object is examined (if more than one object is selected as a result of the query), and the ancestry of that leaf object is followed until either an object is retrieved that already exists in the linked list representing the ancestry of the first object or another top-level container is encountered. Repeating this process for all the other objects in the selection reconstructs the minimal tree containing those objects.

Figure 11:
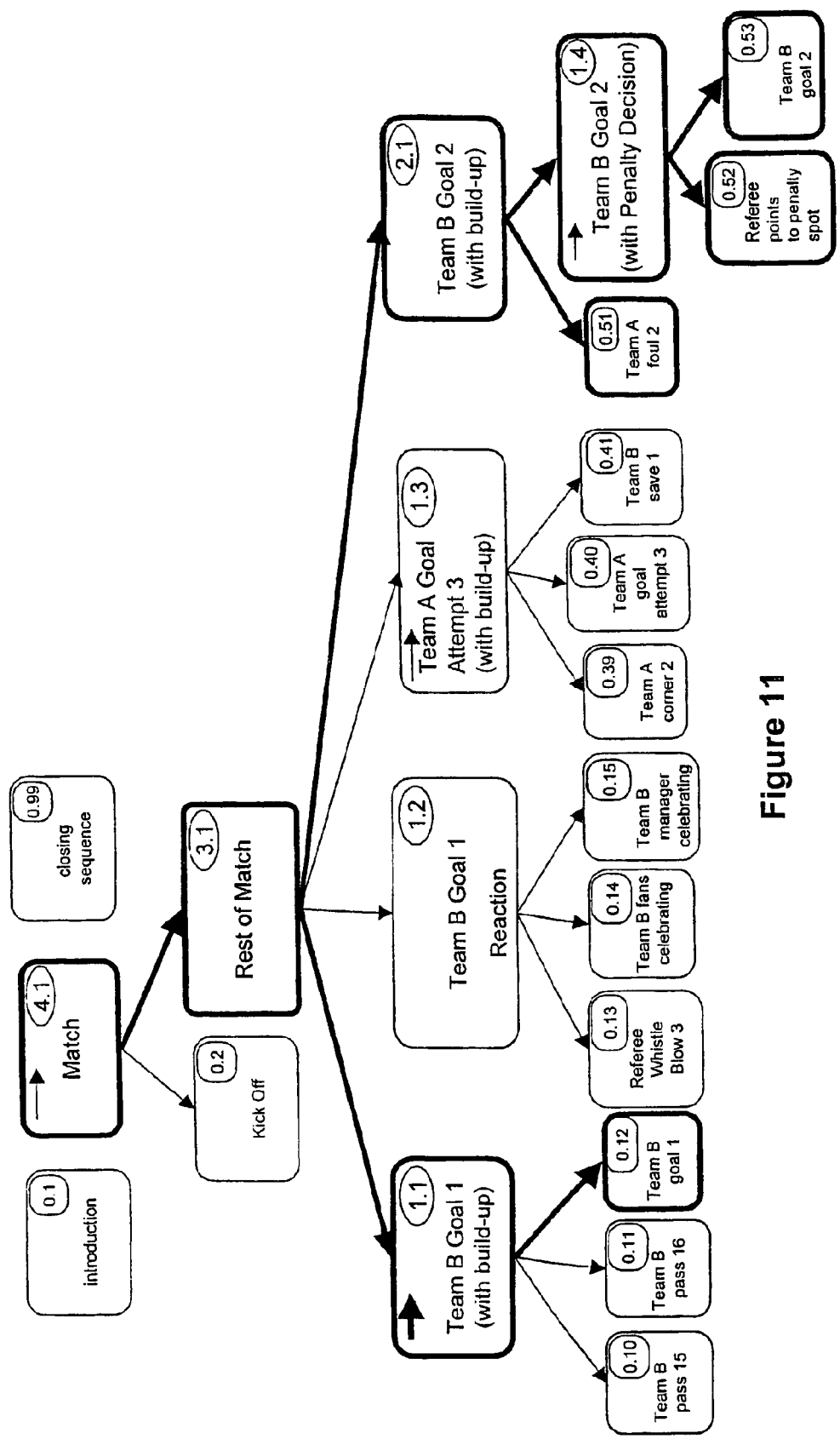
FIG. 11 shows a tree whose leaves are the media objects selected in response to the primary query.

The minimal tree might then be as shown in FIG. 11, for example.

The building of the tree (steps 62 to 64) is followed by sorting (step 68) of the objects within the tree.

The sorting (step 68) takes account of the sequence information entered by the user. The is done by using the known 'Quicksort' algorithm to place the nodes of the tree in the correct order as identified by the sequence position metadata associated with the object. This is done starting at the top of the tree and then moving towards the leaves (i.e. the media objects) of the tree.

The template populator then evaluates any constraints and updates the tree accordingly (step 72). To evaluate a time constraint, the duration of each media object included within the tree is calculated by subtracting the 'Out' property from the 'In' property, and these durations are added together to reach an actual duration. If this duration is found to be greater than the target duration, then media objects are removed from the tree. If this duration is less than the target duration, then media objects are added to the tree.

Where the actual duration is less than the target duration, MediaObjects which belong to the same sequence as any of the MediaObjects selected in response to the first query are selected—they are then appended to the selected MediaObjects in order of closeness in sequence, and order of duration. A new tree for the current section is then created in the same way as the original tree. This process is repeated until the actual duration is greater than the target duration.

It will be appreciated that this step will be slightly quicker than might otherwise be the case, since this MediaObject was brought into volatile memory 17 on the issuance of the secondary query in step 715.

When all sections have been populated with media object metadata and sequenced in accordance with the queries and constraints provided, the template populator outputs (step 78) the edit decision list (FIG. 12) by concatenating the media elements found at the leaves of the trees generated in the three iterations of the loop.

The edit decision list (FIG. 12) produced by the template populator program module (46) is passed to the content synthesiser module (48) in the PC. In the present example, the content synthesiser module outputs one scene after another in a streamed video presentation or concatenates the scenes together in order to produce a programme file. It will, of course, be realised that a user will wish to be provided with an automatically generated programme after as short a delay as possible.

It will be seen that the present embodiment goes some way towards achieving this by storing relationship data in the database which indicates relationships between objects in the database. By analysing the relationship data, secondary objects related to primary objects returned in response a query can be identified and brought into a cache. Subsequent queries (which are likely to require access to the secondary objects in order to be resolved) are then speeded up.

The present invention may be embodied in many different ways. For example, the embodiment described above may be altered in one or more of the ways listed below to provide an alternative embodiment of the present invention (this list is by no means exhaustive):

i) although the first embodiment shows personal computers connected to the server by the Internet, other embodiments of the invention could use set-top boxes instead of the computers, the resulting video being shown on an associated television set. It is also possible to use televisions having the functionality of such a set-top box built in. Instead of the Internet, other networks such as cable television networks, satellite or terrestrial wireless networks could be used;

ii) the constraints section in the template might be variable by the user—for example, a user could be provided with a graphical user interface in which he can select the duration of the media article he wishes to see. A corresponding value can then be added to the template object by the template populator program;

iii) an object-oriented database is used in the above embodiment—other embodiments of the present invention could use a relational database. In such embodiments, the relationship data indicating semantically related data items could be stored in a separate table, the connections between records in the database and a record in another table listing one or more semantically-related data items being made using primary and secondary keys to indicate the association between the two tables. In such a case, the metadata shown in FIG. 3 could be stored as one or more records in respective tables;

iv) in the above embodiment, the ObjectStore client program runs on the server computer. In alternative embodiments, the ObjectStore client could be run on the client computers instead. In that case, the caching would be even more beneficial since the taken to send a request and response across the Internet would be saved each time a relevant data item was found in the memory of the client computer.

The invention claimed is:

1. A computer system comprising:
   i) one or more data processors;
   ii) persistent storage memory operatively connectable to said one or more data processors, said persistent storage memory storing a plurality of media file metadata items, one or more of said media file metadata items containing reference(s) to one or more other media file metadata items, where the one or more of said media file metadata items containing the reference(s) is about a media file which encodes content that has been judged by an editor to be semantically-related to the content encoded by the media file(s) associated with the media file metadata item(s) to which the reference(s) refer;
iii) volatile memory, operatively connectable to said one or more data processors, for storing one or more of said media file metadata items;
iv) database management system software executable by said one or more data processors to respond to a query by passing media file metadata items meeting one or more criteria specified in said query from said persistent storage memory to said volatile memory;
v) querying code executable by said one or more data processors to pass a query to said database management system software;
vi) pre-fetching code executable by said one or more data processors to:
a) analyse response media file metadata items provided in response to said query to find said reference(s) to one or more related media file metadata items; and
b) use said reference(s) to automatically generate another query for said related media file metadata items.

2. The computer system according to claim 1 comprising a client computer and a server computer, each having at least one of said processors, said server computer having control over said persistent memory and said client computer having control over said volatile memory.

3. The computer system according to claim 2 wherein said media file metadata items are transferred in the form of pages of memory.

4. The computer system according to claim 2 in which said server computer resolves said query and sends the selected media file metadata items to said client computer.

5. The computer system according to claim 2 in which said server computer sends said media file metadata items to said client computer and said client computer resolves said query.

6. The computer system according to claim 1 wherein said media file metadata items are software objects.

7. A method of operating a computer system comprising a processor and first and second data stores accessible to said processor, access by said processor to data held in said first store being quicker than access to said second store, said method comprising:
storing a plurality of media file metadata items in said second data store, together with relationship data comprising reference(s) to one or more related media file metadata items where one or more of the plurality of media file metadata items stored together with relationship data comprising the reference(s) is about a media file which encodes content that has been judged by an editor to be semantically-related to the content encoded by the media file(s) associated with the media file metadata item(s) to which the reference(s) refer; and
executing a process on said processor to:
i) fetch one or more media file metadata items from said second store together with said relationship data including said reference(s) to one or more related media file metadata items;
ii) responsive to receipt of said relationship data, use said reference(s) to fetch one or more of said related media file metadata items from said second memory to said first memory; and
iii) check, on subsequent requests for a media file metadata item, whether said requested media file metadata item is present in said first store and read said media file metadata item from said first store if found.

8. A method according to claim 7 in which said media file metadata items comprise an identifier of a media file and metadata representing what is portrayed by said identified media file.

9. A method according to claim 7 in which said second store holds a database.

* * * * *